United States Patent Office.

HIRAM S. UTLEY AND HENRY S. BOWEN, OF CHICAGO, ILLINOIS.

DECORATED MIRROR.

SPECIFICATION forming part of Letters Patent No. 333,433, dated December 29, 1885.

Application filed February 25, 1885. Serial No. 158,275. (Specimens.)

*To all whom it may concern:*

Be it known that we, HIRAM S. UTLEY and HENRY S. BOWEN, both citizens of the United States, and residing in Chicago, county of Cook, and State of Illinois, have invented certain new and useful Improvements in Decorated Mirrors, of which the following is a specification.

This invention relates to improvements in decorated mirrors, in which a portion of the silvering is omitted or removed in such a manner that the application to the spaces thus formed of tinted or colored substances will give an ornamented and artistic appearance to such a mirror.

The essential object of this invention is to produce a mirror the filled spaces whereof shall present the appearance of polished granite, marble, or other decorative stones bordering the silvered portions, or of the mirror being set in said substances. We attain this object by removing or omitting silvering from the mirror, so that the outline of the spaces thus formed shall constitute some pleasing design on the face of the mirror; and in this connection it may be stated that we do not limit ourselves to the peculiar outline of the design or designs employed, for it may be made in a great variety of forms, to please the tastes of as many persons. After thoroughly removing or omitting the silvering from the entire surface of these spaces we may, for the purposes of producing an imitation of polished granite, use any known method or materials for that purpose—as, for example, varnish, granulated porcelain, slate, tinted paint and sand or granulated sea-shells and pebbles, or any other substances suitable for the purpose of producing the desired imitation, and with or without the employment of sand, for we do not herein limit ourselves to any particular material or materials or process for producing the ornamental mirrors herein described. In like manner we may also produce in these spaces an imitation of any of the polished marbles by employing a filling constituted, in part, of suitable powdered and tinted substances adapted to produce the desired result.

As before stated, mirrors ornamented in this manner have the appearance of being very neatly set in a stone or marble, and with perfectly smooth and finished joints, and, besides, the coating not only serves to ward off substances tending to scratch off the silvering, but when spread entirely over the back of it strengthens the mirror, effectually protects the silvering from being scratched, and its discoloration by moisture.

In addition to the pleasing effect obtained by ornamenting mirrors in this manner, it may be observed that in many cases where mirrors are more or less disfigured our ornamentation may be used to good advantage and at an exceedingly small cost to obliterate said disfigurations, and at the same time ornament the mirror without materially destroying its functions as a mirror.

It may also be stated that the mirror may be laid upon and secured to a plain piece of glass, and the ornamentation be applied to that glass instead of directly to the silvered glass.

We are aware that before our invention plain glass and other transparent substances have first been coated with varnish on which was applied metallic chips, filings, or powders and powdered glass or sand, either singly or combined, for the purposes of ornamentation; but it is obvious that such metallic or silicious substances do not produce the effects hereinbefore described, and are not the equivalent of or capable of producing, either upon a plain or mirrored surface, an imitation stone such as is contemplated by our invention.

Having described our invention, what we claim, and desire to secure by Letters Patent, is—

As a new article of manufacture, a mirror or other silvered surface ornamented with a bordering or other design in imitation of polished stone or marble, substantially as described.

HIRAM S. UTLEY.
HENRY S. BOWEN.

Witnesses:
W. W. ELLIOTT,
WILL R. OMOHUNDRO.